(12) United States Patent
Tamura et al.

(10) Patent No.: US 10,768,122 B2
(45) Date of Patent: Sep. 8, 2020

(54) RADIATION IMAGING SYSTEM, RADIATION IMAGING METHOD, AND NON-TRANSITORY COMPUTER-READABLE STORAGE MEDIUM

(71) Applicant: CANON KABUSHIKI KAISHA, Tokyo (JP)

(72) Inventors: Toshikazu Tamura, Utsunomiya (JP); Hiroki Asai, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 251 days.

(21) Appl. No.: 15/923,093

(22) Filed: Mar. 16, 2018

(65) Prior Publication Data
US 2018/0275075 A1    Sep. 27, 2018

(30) Foreign Application Priority Data
Mar. 22, 2017 (JP) ................ 2017-056461

(51) Int. Cl.
G01N 23/04 (2018.01)
G06T 5/50 (2006.01)

(52) U.S. Cl.
CPC ............. *G01N 23/04* (2013.01); *G06T 5/50* (2013.01); *G01N 2223/3103* (2013.01); *G06T 2207/10116* (2013.01)

(58) Field of Classification Search
CPC .. G01N 23/04; G01N 2223/3103; G06T 5/50; G06T 2207/10116
See application file for complete search history.

(56) References Cited

U.S. PATENT DOCUMENTS

| | | | | |
|---|---|---|---|---|
| 4,358,685 A | * | 11/1982 | Carton | G03B 37/005 250/475.2 |
| 4,797,907 A | * | 1/1989 | Anderton | H05G 1/10 378/101 |
| 4,853,946 A | * | 8/1989 | Elliott | A61B 6/035 378/4 |
| 4,947,123 A | * | 8/1990 | Minezawa | G01R 31/374 324/427 |

(Continued)

FOREIGN PATENT DOCUMENTS

| | | |
|---|---|---|
| JP | 4557697 B | 10/2010 |
| JP | 2016-095278 A | 5/2016 |

OTHER PUBLICATIONS

U.S. Appl. No. 15/891,824, Hiroki Asai, filed Feb. 8, 2018.
U.S. Appl. No. 15/944,204, Hiroki Asai, filed Apr. 3, 2018.

*Primary Examiner* — Blake C Riddick
(74) *Attorney, Agent, or Firm* — Venable LLP

(57) ABSTRACT

A radiation imaging system stabilizes a change in temperature of a radiation imaging apparatus, obtains a radiation image of an object based on radiation applied from a radiation source and reaching through the object, obtains a correction image by performing imaging without irradiation with the radiation from the radiation source, performs, using the correction image, image processing for correcting an offset component appearing in the radiation image on the radiation image, and determines whether stabilization of a change in temperature of the radiation imaging apparatus is effectively functioning. The radiation imaging system switches modes of obtaining the correction image based on determination.

11 Claims, 8 Drawing Sheets

(56) References Cited

U.S. PATENT DOCUMENTS

| | | | | |
|---|---|---|---|---|
| 4,952,862 A | * | 8/1990 | Biagetti | G01R 31/3648 320/132 |
| 5,121,156 A | * | 6/1992 | Sakakibara | G03B 27/32 355/30 |
| 5,140,445 A | * | 8/1992 | Takashima | H04N 1/00885 250/238 |
| 5,278,487 A | * | 1/1994 | Koenck | H02J 7/0078 320/132 |
| 5,394,089 A | * | 2/1995 | Clegg | G01R 31/3842 324/427 |
| 5,530,362 A | * | 6/1996 | Boehm | G01R 31/382 324/427 |
| 6,265,720 B1 | * | 7/2001 | Yamazaki | H04N 5/32 250/252.1 |
| 6,624,421 B1 | * | 9/2003 | Takeda | G01T 1/2018 250/363.01 |
| 7,492,865 B2 | | 2/2009 | Hahm et al. | |
| 9,606,246 B2 | | 3/2017 | Naito | |
| 9,921,319 B2 | | 3/2018 | Asai et al. | |
| 2006/0013465 A1 | * | 1/2006 | Nonaka | G06T 3/40 382/132 |
| 2006/0243910 A1 | * | 11/2006 | Nonaka | A61B 6/032 250/336.1 |
| 2007/0098236 A1 | * | 5/2007 | Maack | H04N 5/347 382/128 |
| 2008/0170666 A1 | * | 7/2008 | Coombs | A61B 6/56 378/101 |
| 2009/0014661 A1 | * | 1/2009 | Yagi | A61B 6/4233 250/370.11 |
| 2009/0232278 A1 | * | 9/2009 | Ohara | A61B 6/548 378/116 |
| 2009/0272888 A1 | * | 11/2009 | Nugent | G01D 18/00 250/252.1 |
| 2010/0142791 A1 | * | 6/2010 | Tsuji | G06T 5/50 382/132 |
| 2010/0187410 A1 | * | 7/2010 | Iijima | H04N 5/32 250/252.1 |
| 2010/0245378 A1 | * | 9/2010 | Matsuura | A61B 6/583 345/589 |
| 2011/0317054 A1 | | 12/2011 | Kameshima et al. | |
| 2012/0075600 A1 | * | 3/2012 | Sato | G03B 42/02 355/18 |
| 2012/0140882 A1 | * | 6/2012 | Iwakiri | A61B 6/502 378/62 |
| 2012/0230469 A1 | * | 9/2012 | Yamanaka | A61B 6/5205 378/62 |
| 2012/0275564 A1 | * | 11/2012 | Hashimoto | A61B 6/484 378/62 |
| 2013/0068961 A1 | * | 3/2013 | Tajima | G01T 1/17 250/394 |
| 2013/0329981 A1 | * | 12/2013 | Hiroike | G06T 7/0012 382/132 |
| 2014/0254765 A1 | * | 9/2014 | Asai | A61B 6/461 378/98.5 |
| 2014/0267837 A1 | * | 9/2014 | Tsuji | H04N 5/32 348/241 |
| 2015/0310597 A1 | * | 10/2015 | Ohguri | H04N 5/2254 382/275 |
| 2015/0373292 A1 | * | 12/2015 | Ikawa | H04N 5/3415 250/208.1 |
| 2016/0044306 A1 | * | 2/2016 | Chahine | H04N 5/2353 348/164 |
| 2016/0358330 A1 | | 12/2016 | Asai | |
| 2016/0370304 A1 | | 12/2016 | Asai | |

\* cited by examiner

F I G. 2
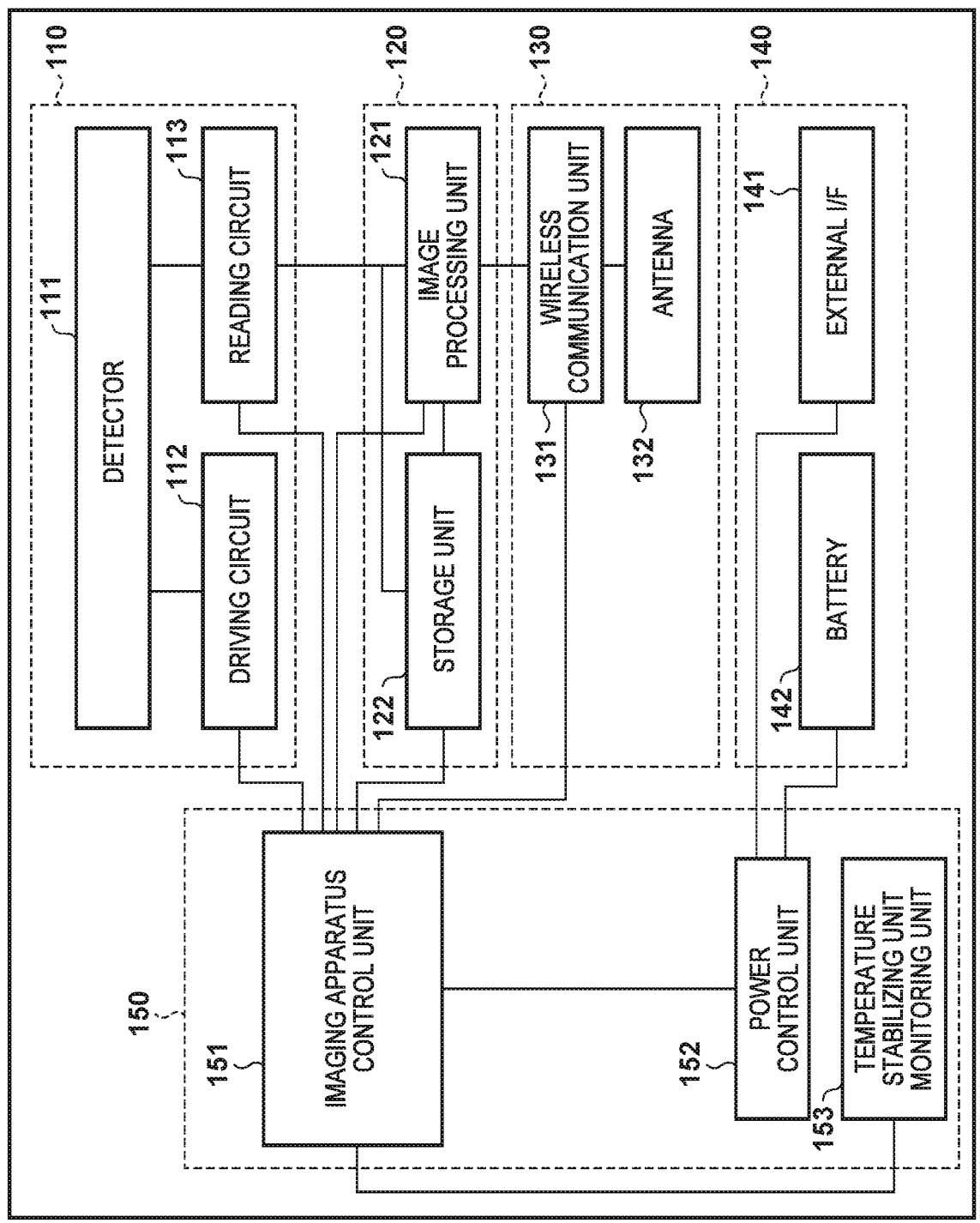

RADIATION IMAGING SYSTEM, RADIATION IMAGING METHOD, AND NON-TRANSITORY COMPUTER-READABLE STORAGE MEDIUM

BACKGROUND OF THE INVENTION

Field of the Invention

The present invention relates to a radiation imaging system, a radiation imaging method, and a non-transitory computer-readable storage medium.

Description of the Related Art

As a radiation imaging apparatus that obtains a radiation image by using radiation (X-rays or the like) transmitted through an object, a radiation imaging apparatus that can display a radiation image in real time has been widely used. In addition, a radiation imaging apparatus using an FPD (Flat Panel Detector) has been proposed.

An FPD has minute radiation detectors arranged on a silica glass substrate in a matrix pattern. Each radiation detector is formed by stacking a solid-state photodetector having an amorphous semiconductor sandwiched between a transparent conductive film and a conductive film and a scintillator that converts radiation into visible light. There is known an FPD using, as a solid-state photodetector, a photodetector such as a CCD (Charge-Coupled device) or CMOS (Complementary Metal-Oxide Semiconductor). A radiation detector is also known, which directly detects radiation by using a solid-state detector without using any scintillator.

An FPD detects the dose of radiation applied during an arbitrary accumulation time as a charge amount. For this reason, if charge irrelevant to irradiation with radiation exists in a radiation detector at the time of obtaining a radiation image of an object, this charge is superimposed as noise on the radiation image. This causes a deterioration in the image quality of the radiation image.

An example of charge behaving as noise is residual charge that remains based on the characteristics of a solid-state detector or scintillator after preceding imaging for a radiation image. Another example of charge behaving as noise is dark current caused by charge generated by a solid-state photodetector mainly due to the influence of temperature. The image quality of a radiation image is also degraded by fixed noise caused by a defect unique to a radiation detector.

At the time of obtaining a radiation image of an object, residual charge and charge corresponding to a dark current component are accumulated in proportion to the accumulation time of an image during irradiation with radiation. This causes a deterioration in the image quality of the radiation image. For this reason, in obtaining a radiation image of an object, offset correction processing is performed to correct offset components caused by residual charge accumulated during imaging, dark current charge, fixed noise, and the like. In general, offset correction processing is performed by subtracting, from the radiation image, offset correction data that is image data (non-exposure image data) obtained by imaging without irradiation with radiation.

There are a plurality of offset correction methods. For example, such methods include (1) a method (for intermittent dark current) of performing offset correction processing by alternately obtaining a radiation image of an object and obtaining non-exposure image data (offset correction data) and subtracting each offset correction data from a corresponding radiation image, and (2) a method (for fixed dark current) of performing offset correction processing by substracting, as offset correction data, non-exposure image data obtained before imaging for a radiation image of an object from the radiation image.

The following are the characteristic features of the methods (1) and (2). The method (1) is configured to alternately obtain a radiation image of an object and non-exposure image data (offset correction data), and hence can reduce an image lag. However, the method (1) has a problem in that the frame rate is low.

In contrast to this, in the method (2), because offset correction data is obtained before imaging for a radiation image of an object, the frame rate is high, and high-speed continuous imaging such as moving-image capturing can be performed. In addition, because imaging at a low dose can be performed, the SNR is high. The method (2) has a problem in that an image lag cannot be sufficiently reduced. In addition, the dark current charge accumulated during imaging changes due to the influences of the temperature of a radiation detector, imaging conditions, the temporal degradation of a sensor, and the like. For this reason, when offset correction data is obtained before imaging for a radiation image of an object, the accuracy of offset correction processing is not satisfactory. This makes it necessary to periodically obtain offset correction data. This requires high power consumption for operations other than an imaging operation.

A general FPD tends to undergo instability in dark current charge immediately after the start of driving of a radiation detector or immediately after irradiation with radiation. It is also known that residual charge generated immediately after irradiation with radiation rapidly changes especially immediately after the completion of irradiation with radiation. This makes it necessary to ensure a predetermined time in the interval from the start of driving of the radiation detector to imaging for a radiation image or the interval from imaging for a preceding radiation image to imaging for a next radiation image, in order to execute stable offset correction processing. On the other hand, in order to improve the operability of the radiation imaging apparatus, it is desired to obtain a radiation image in a short time immediately after the start of driving or immediately after imaging for a radiation image.

Various types of techniques have been proposed as conventional techniques aiming at holding the accuracy of offset correction processing. More specifically, Japanese Patent No. 4557697 has proposed a technique for obtaining offset correction data by determining the stability and variation amount of offset correction data with respect to time, in order to hold the accuracy of offset correction processing. U.S. Pat. No. 7,492,865 has proposed a technique for switching between methods of obtaining offset correction data depending on whether to obtain a moving image or still image. Japanese Patent Laid-Open No. 2016-95278 has proposed a technique for reducing temperature fluctuations affecting offset correction processing by always performing the same operation regardless of frame rates.

The above literatures each aim at holding the accuracy of offset correction processing but give no consideration to a mechanism (for example, a cooling mechanism) for temperature fluctuation stabilization to reduce the influence of charge as noise generated by the influence of the temperature of a radiation imaging apparatus. It is therefore necessary to perform proper offset correction in accordance with whether such a mechanism for temperature fluctuation stabilization is effective for the radiation imaging apparatus in consideration of the features of the above offset correction method.

SUMMARY OF THE INVENTION

This disclosure provides a technique for performing a proper offset correction method in accordance with whether a mechanism for performing temperature fluctuation stabilization effectively functions, in consideration of the above problem.

According to one aspect of the present invention, there is provided a radiation imaging system which comprises: a temperature stabilizing unit configured to stabilize a change in temperature of a radiation imaging apparatus; an imaging unit configured to obtain a radiation image of an object based on radiation applied from a radiation source and reaching through the object; an obtaining unit configured to obtain a correction image by performing imaging without irradiation with the radiation from the radiation source; an image processing unit configured to perform, using the correction image, image processing for correcting an offset component appearing in the radiation image on the radiation image obtained by the imaging unit; and a determination unit configured to determine whether stabilization of a change in temperature of the radiation imaging apparatus by the temperature stabilizing unit is effectively functioning, wherein the obtaining unit switches modes of obtaining the correction image based on determination performed by the determination unit.

Further features of the present invention will become apparent from the following description of exemplary embodiments (with reference to the attached drawings).

BRIEF DESCRIPTION OF THE DRAWINGS

FIG. 2 is a block diagram showing an example of the arrangement of a radiation imaging apparatus according to the first embodiment;

DESCRIPTION OF THE EMBODIMENTS

Figure 1:
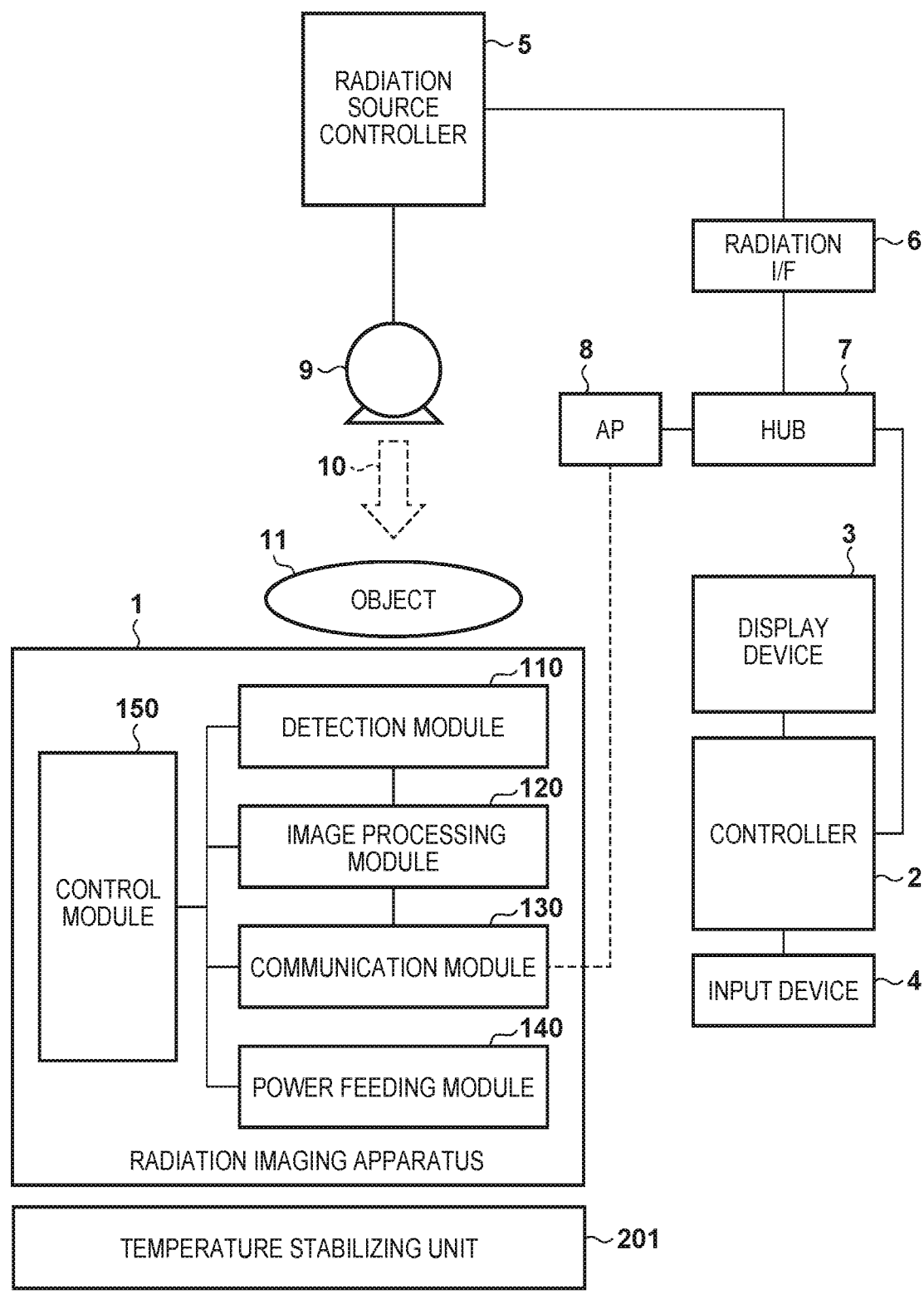
FIG. 1 is a block diagram showing an example of the arrangement of a radiation imaging system according to the first embodiment.

The embodiments of the present invention will be described in detail below with reference to the accompanying drawings. Note that the arrangements described in the following embodiments each are merely an example, and the present invention is not limited to the arrangements shown in the drawings.

First Embodiment

FIG. 1 shows an example of the arrangement of a radiation imaging system according to the first embodiment. Note that the radiation imaging system according to this embodiment includes at least a radiation imaging apparatus 1 and a controller 2 among the constituent elements shown in FIG. 1.

The radiation imaging apparatus 1 obtains the radiation image data of an object 11 based on radiation 10 transmitted through the object 11 irradiated by a radiation source 9 under the control of a radiation source controller 5. The radiation imaging apparatus 1 can be, for example, a radiation imaging apparatus using an FPD. The radiation imaging apparatus 1 can also be configured as, for example, a portable apparatus.

The radiation imaging apparatus 1 includes a detection module 110 as a radiation detection unit, an image processing module 120 as an image processing unit that performs image processing, a communication module 130 as a communication unit, a power supply module 140 as a power supply unit that controls power supply to the radiation imaging apparatus 1, and a control module 150 as a control unit that comprehensively controls the radiation imaging apparatus 1. Note that these modules are merely examples that implement the above units. For example, the radiation imaging apparatus 1 may be configured to include the detection module 110 (as an imaging unit and an obtaining unit which will be described later) and the control module 150 (its part) for controlling the detection module 110 without including other modules. The details of each module will be described later.

The radiation imaging apparatus 1 is connected to a temperature stabilizing unit. In this embodiment, this unit is implemented by, for example, a temperature stabilizing unit 201. The temperature stabilizing unit 201 is a mechanism for reducing changes in the temperature of the radiation imaging apparatus 1, and is a cooling controller using air or water. In addition, the temperature stabilizing unit 201 can include a mechanism that increases the heat capacity of the radiation imaging apparatus 1 by being brought into contact with it with a small heat resistance or actively dissipates heat outside the apparatus. In this embodiment, the temperature stabilizing unit 201 is detachable with respect to the radiation imaging apparatus 1.

The detection module 110 converts radiation reaching from a radiation source 9 into an electrical signal. The converted electrical signal is digitized and sent to the image processing module 120 to be subjected to various types of image processing including offset correction. The processed signal is sent to the communication module 130. The signal sent to the communication module 130 is transmitted as image data to the controller 2 arranged outside.

The controller 2 performs various types of control operations such as control on the operation of the radiation imaging system, imaging modes, and the like and control on processing of image data obtained by the radiation imaging apparatus 1. As the controller 2, for example, one of various types of computers and workstations can be used. The controller 2 can be connected to a display device 3 such as display for displaying a menu for control and image data after imaging and an input device 4 such as a mouse and a keyboard for performing various types of input operations. An imaging mode is a mode for determining settings concerning imaging, and is set by, for example, the user via the input device 4. A plurality of imaging modes may be set.

The radiation source 9 is constituted by an electron gun for generating the radiation 10 such as X-rays, a rotor, and the like. Electrons collide with the rotor while being accelerated by the high voltage generated by the radiation source controller 5 to generate X-rays (radiation).

The radiation imaging apparatus 1 and the controller 2 communicate with each other via a wireless LAN via an external access point (AP) 8, as shown in, for example, FIG. 1. The radiation imaging apparatus 1 and the controller 2 may directly communicate with each other without via the AP 8 by making one of them serve as an access point. Alternatively, the radiation imaging apparatus 1 and the controller 2 may communicate with each other via another wireless communication unit such as Bluetooth®. Alternatively, the radiation imaging apparatus 1 and the controller 2 may communicate with each other via a wired communication unit such as Ethernet®.

A radiation interface unit (radiation I/F) 6 is provided between the controller 2 and the radiation source controller 5. The radiation I/F 6 relays communication performed between the radiation imaging apparatus 1 and the radiation source controller 5 via a switching HUB 7 and the AP 8. In addition, the radiation I/F 6 can adjust the irradiation timing of radiation from the radiation source 9 in accordance with, for example, the state of the radiation imaging apparatus 1 by observing the states of the radiation imaging apparatus 1 and the radiation source controller 5. Furthermore, the radiation I/F 6 is also connected to the controller 2 via the switching HUB 7 to relay exchange of various types control signals and information. The switching HUB 7 is a unit for connection to a plurality of network devices.

Figure 8:
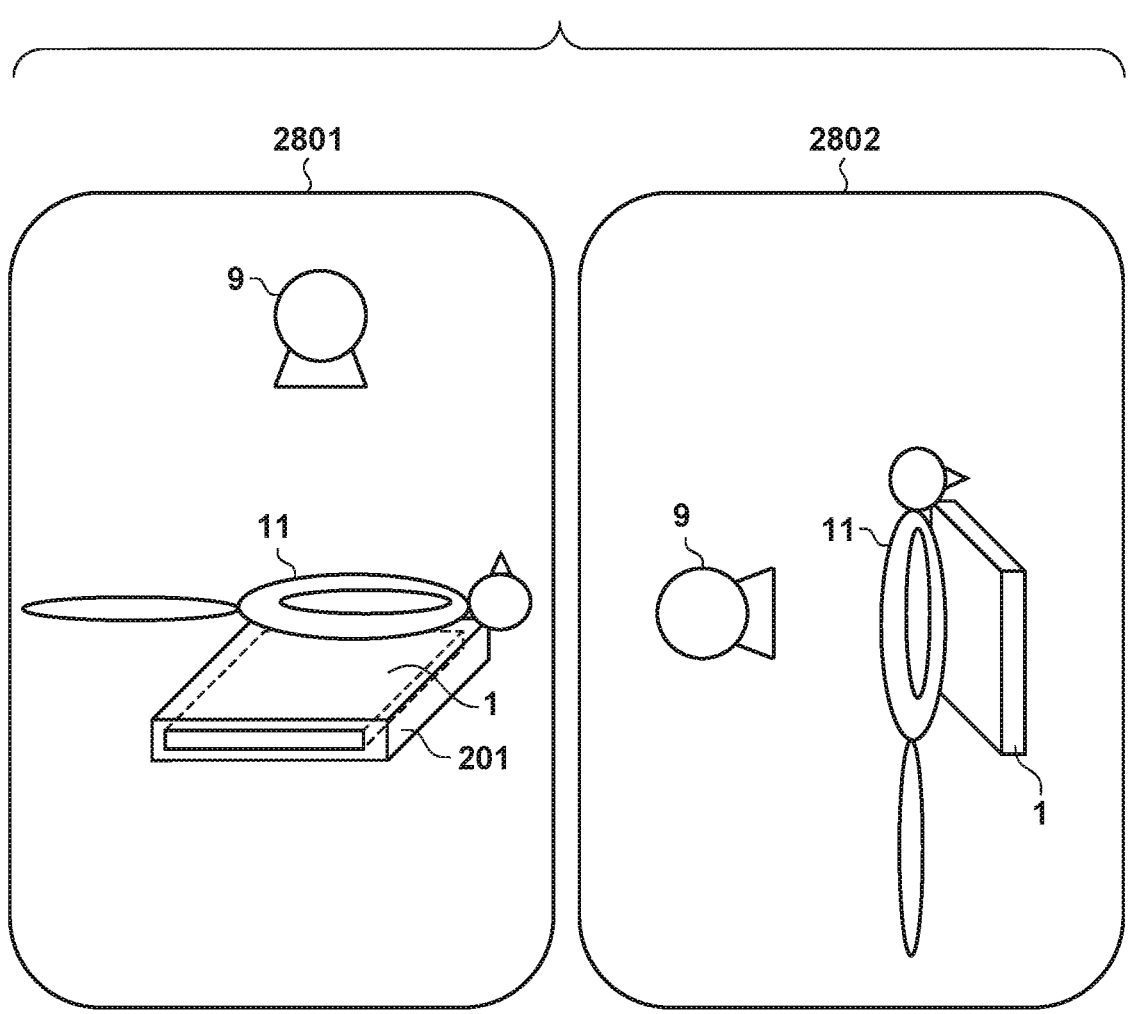
FIG. 8 is a view showing a usage example of the radiation imaging apparatus.

FIG. 8 is a view showing a usage example of the radiation imaging apparatus 1 according to this embodiment. In a usage example 801, the radiation imaging apparatus 1 is connected to the temperature stabilizing unit 201, which is effectively functioning. The radiation imaging apparatus 1 is held on a holding portion in, for example, a remote control table (not explicitly shown). In the usage example 801, as will be described later, because offset correction data is obtained by the method (2) described above, the radiation imaging apparatus 1 can perform high-speed (high frame rate) imaging or high SNR imaging. In contrast to this, in a usage example 802, the radiation imaging apparatus 1 is not connected to the temperature stabilizing unit 201. In this case, as will be described later, the radiation imaging apparatus 1 obtains offset correction data by the method (1) described above. In the usage example 802, the radiation imaging apparatus 1 is held on a holding portion such as an upright gantry having a single function (not explicitly shown) for, for example, imaging at a bed during a doctor's rounds in a medical ward or imaging at a stretcher in an emergency.

FIG. 2 shows an example of the arrangement of the radiation imaging apparatus 1 according to this embodiment. The detection module 110 obtains a radiation image of an object. More specifically, the detection module 110 includes a detector 111, a driving circuit 112, and a reading circuit 113. The detection module 110 detects radiation and generates image data (radiation image). The detector 111 includes a scintillator and a photodetector array, detects radiation, and generates image data. The scintillator emits fluorescence in a visible region by using recombination energy generated when the mother substance of a phosphor is excited by high-energy radiation transmitted through an object and recombination occurs. This fluorescence is generated by a mother substance itself such as $CaWO_4$ or $CdWO_4$ or a luminescence center substance added in the mother substance, such as CsI:Tl or ZnS:Ag. The photodetector array outputs an electrical signal corresponding to the amount of fluorescence (the dose of radiation incident on the scintillator) detected by each pixel constituting the photodetector array in accordance with the operation of the driving circuit 112.

The reading circuit 113 includes an amplifier IC (Integrated Circuit) and an A/D converter. The reading circuit 113 amplifies electrical signals output from the photodetector array included in the detector 111 by using the amplifier IC, as needed, and obtains image data (radiation image) by converting the signal into a digital signal using the A/D converter. The reading circuit 113 outputs the obtained image data (radiation image) to an image processing unit 121 of the image processing module 120. In addition, the reading circuit 113 can obtain image data (non-exposure image data) without irradiation with radiation as a correction image used by the image processing unit 121, and output the data to the image processing unit 121. The radiation image and the non-exposure image data can be stored in a storage unit 122. The driving circuit 112 and the reading circuit 113 can operate in accordance with instructions from an imaging apparatus control unit 151 (to be described later).

The image processing module 120 includes the image processing unit 121 and the storage unit 122. The image processing unit 121 applies image processing such as gain processing and offset correction processing to a radiation image output from the reading circuit 113. The image processing unit 121 performs the offset correction processing of correcting an offset component appearing in a radiation image by subtracting, from the radiation image, offset correction data (non-exposure image data) as a correction image stored in the storage unit 122 under the control of the control module 150. The image processing unit 121 may apply other types of basic image processing such as gain correction processing to the radiation image to obtain low-noise radiation image data. The image processing unit 121 may further apply image processing including image quality adjustment required by the user, such as tone correction, to the radiation image.

The storage unit 122 stores radiation images output from the reading circuit 113, processed radiation images output from the image processing unit 121, correction data (offset correction data, gain correction data, defect information, and the like), and the like. No limitations are imposed on how the storage unit 122 is implemented in practice. The storage unit 122 may be implemented by one or a plurality of memories or HDDs (Hard Disc Drives) or various combinations of volatile and nonvolatile memories.

The communication module 130 includes a wireless communication unit 131 and an antenna 132. The communication module 130 receives a processed radiation image from the image processing unit 121. The wireless communication unit 131 transmits the processed radiation image and the like to the external controller 2 and the like via the antenna 132.

The power supply module 140 includes an external interface (external I/F) 141 and a battery 142. Offset correction procedures performed by the image processing unit 121 are switched, as will be described later, depending on whether power is supplied from the external I/F 141 or the battery 142.

The control module 150 includes the imaging apparatus control unit 151, a power control unit 152, and a temperature stabilizing unit monitoring unit 153. The power control unit 152 controls the operating power supply of the radiation imaging apparatus 1. Upon receiving power supplied from the battery 142 or the external I/F 141, the power control unit 152 generates various types of power necessary for the operation of the radiation imaging apparatus 1 and supplies the power to each unit of the radiation imaging apparatus 1.

The power control unit 152 transfers, to the imaging apparatus control unit 151, information indicating whether power is supplied from the external I/F 141 or the battery 142. In addition, the power control unit 152 may have a function for detecting the remaining capacity of the battery 142 and a function for controlling the charging of the battery 142.

The temperature stabilizing unit monitoring unit 153 functions as a determination unit for determining the state of the temperature stabilizing unit 201 (determining, for example, whether the temperature stabilizing unit 201 is effectively functioning for the radiation imaging apparatus 1), and transfers the determination result to the imaging apparatus control unit 151. For example, when determining the state of the temperature stabilizing unit 201, the temperature stabilizing unit monitoring unit 153 determines whether the radiation imaging apparatus 1 is connected to the temperature stabilizing unit 201, and transfers the determination result to the imaging apparatus control unit 151. For example, the temperature stabilizing unit monitoring unit 153 determines whether the radiation imaging apparatus 1 is connected to the temperature stabilizing unit 201, based on proximity detection by a magnetic sensor, near field communication using an RF tag, or a continuity check by electric contact. Alternatively, unlike the arrangement shown in FIG. 2, the temperature stabilizing unit monitoring unit 153 may determine, via wireless or wired communication with the radiation imaging apparatus 1, whether the radiation imaging apparatus 1 is connected to the temperature stabilizing unit 201. In addition, the temperature stabilizing unit monitoring unit 153 may determine whether the radiation imaging apparatus 1 is connected to the temperature stabilizing unit 201 by determining whether a unit in the radiation imaging apparatus 1 is operated.

The imaging apparatus control unit 151 performs processing associated with control on each unit of the radiation imaging apparatus 1. For example, the imaging apparatus control unit 151 functions as part of the imaging unit to start a driving operation (acquire a radiation image) or functions as part of the obtaining unit to perform control to obtain image data (correction image) without irradiation with the radiation 10. In addition, the imaging apparatus control unit 151 outputs, to the image processing unit 121, an instruction to apply predetermined image processing including offset correction to a radiation image obtained by the reading circuit 113. In this case, the imaging apparatus control unit 151 controls the detection module 110 and the image processing module 120 so as to switch between the offset correction methods in accordance with the state of the temperature stabilizing unit 201, which is transferred from the temperature stabilizing unit monitoring unit 153, and/or information indicating whether power is supplied from the external I/F 141, transferred from the power control unit 152. In this embodiment, the temperature stabilizing unit monitoring unit 153 switches between the offset correction methods (the modes of obtaining correction images) based on the determination performed by the temperature stabilizing unit monitoring unit 153. For example, based on the determination performed by the temperature stabilizing unit monitoring unit 153, the imaging apparatus control unit 151 switches between the first mode of causing the imaging apparatus control unit 151 to function as an obtaining unit before functioning as an imaging unit to obtain a correction image before imaging for a plurality of radiation images and the second mode of causing the imaging apparatus control unit 151 to repeatedly function as an imaging unit first and then function as an obtaining unit to obtain a correction image for each radiation-image imaging operation.

The offset correction methods to be switched in accordance with whether power is supplied from the external I/F 141 will be described below. When power is supplied from the external I/F 141, it is expected to stably supply power from outside the radiation imaging apparatus 1, such as a commercial power supply, whereas when power is not supplied from the external I/F 141, power is supplied from the battery 142 as a limited energy supply source.

In performing offset correction upon obtaining offset correction data before imaging for a radiation image of an object (the method (2) described above), higher power is consumed than in performing offset correction by alternately performing imaging for a radiation image of an object and obtaining offset correction data (the method (1) described above). This is because when the image processing unit 121 obtains offset correction data before imaging for a radiation image of an object, it is difficult to ensure sufficient accuracy for offset correction processing because of the influences of imaging conditions such as temperature fluctuations. It is therefore necessary to periodically obtain offset correction data in all the imaging modes. Alternatively, in this case, the detection module needs to always perform an imaging operation (detecting operation) so as to almost eliminate temperature fluctuations. Consequently, when the image processing unit 121 obtains offset correction data before imaging for a radiation image of an object, the power consumption increases.

When power is supplied from the external I/F 141, the imaging apparatus control unit 151 outputs instructions to the driving circuit 112 and the image processing unit 121 so as to perform offset correction upon obtaining offset correction data before imaging for a radiation image of an object. The image processing unit 121 performs offset correction upon obtaining offset correction data before imaging for a radiation image of an object. In this case, the radiation imaging apparatus 1 can cope with high frame rate imaging because there is no need to obtain offset correction data in subsequent radiation-image imaging operations.

In contrast, when power is supplied from the battery 142, the imaging apparatus control unit 151 outputs instructions to the driving circuit 112 and the image processing unit 121 so as to alternately perform imaging for a radiation image of an object (detecting radiation) and cause the image processing unit 121 to obtain offset correction data. In accordance with this operation, this apparatus alternately causes the detection module 110 to perform imaging for a radiation image of an object (detect radiation) and obtain offset correction data. This can prevent the possible imaging time and the possible number of frames that can be obtained from being limited, even though the frame rate of the radiation imaging apparatus 1 is low, even if power is supplied from the battery 142.

Offset correction methods to be switched in accordance with the state of the temperature stabilizing unit 201 which is transferred from the temperature stabilizing unit monitoring unit 153 will be described next. When the radiation imaging apparatus 1 is connected to the temperature stabilizing unit 201, the influence of changes in the temperature of the radiation imaging apparatus 1 can be reduced. That is, it is possible to solve the problem in performing offset correction upon obtaining offset correction data before imaging for a radiation image of an object. In addition, because operating the temperature stabilizing unit 201 will generally increase the power consumption, power is preferably supplied from the external I/F 141. In this case, therefore, the imaging apparatus control unit 151 outputs instructions to the detection module 110 (the driving circuit 112 and the reading circuit 113) so as to perform offset correction upon obtaining offset correction data before imaging for a radiation image of an object.

In contrast to this, when the radiation imaging apparatus 1 is not connected to the temperature stabilizing unit 201, the imaging apparatus control unit 151 outputs instructions to the detection module 110 (the driving circuit 112 and the reading circuit 113) so as to alternately perform imaging for a radiation image of an object (detecting radiation) and cause the image processing unit 121 to obtain offset correction data.

Note that, as shown in FIG. 1, this embodiment has exemplified the case in which the temperature stabilizing unit 201 is physically arranged outside the radiation imaging apparatus 1. The temperature stabilizing unit 201 may be mounted inside the radiation imaging apparatus 1. In addition, the concepts of operating and stopping the temperature stabilizing unit 201 respectively incorporate the concepts of connecting and not connecting the temperature stabilizing unit 201 to the radiation imaging apparatus 1. This is because operating the temperature stabilizing unit 201 will generally increase the power consumption, and hence a temperature stabilizing mechanism operation often changes in association with a power supply condition (the external I/F 141 or the battery 142). In this case, the temperature stabilizing unit 201 can be formed from either or both of a Peltier element and a heat pipe.

Note that in the arrangement shown in FIG. 2, the imaging apparatus control unit 151, the power control unit 152, and the like each may be implemented by software such as a CPU (Central Processing Unit) or a control signal generating circuit such as an ASIC (Application Specific Integrated Circuit). In addition, the imaging apparatus control unit 151, the power control unit 152, and the like each may be implemented by both a program and a control circuit.

Figure 3:
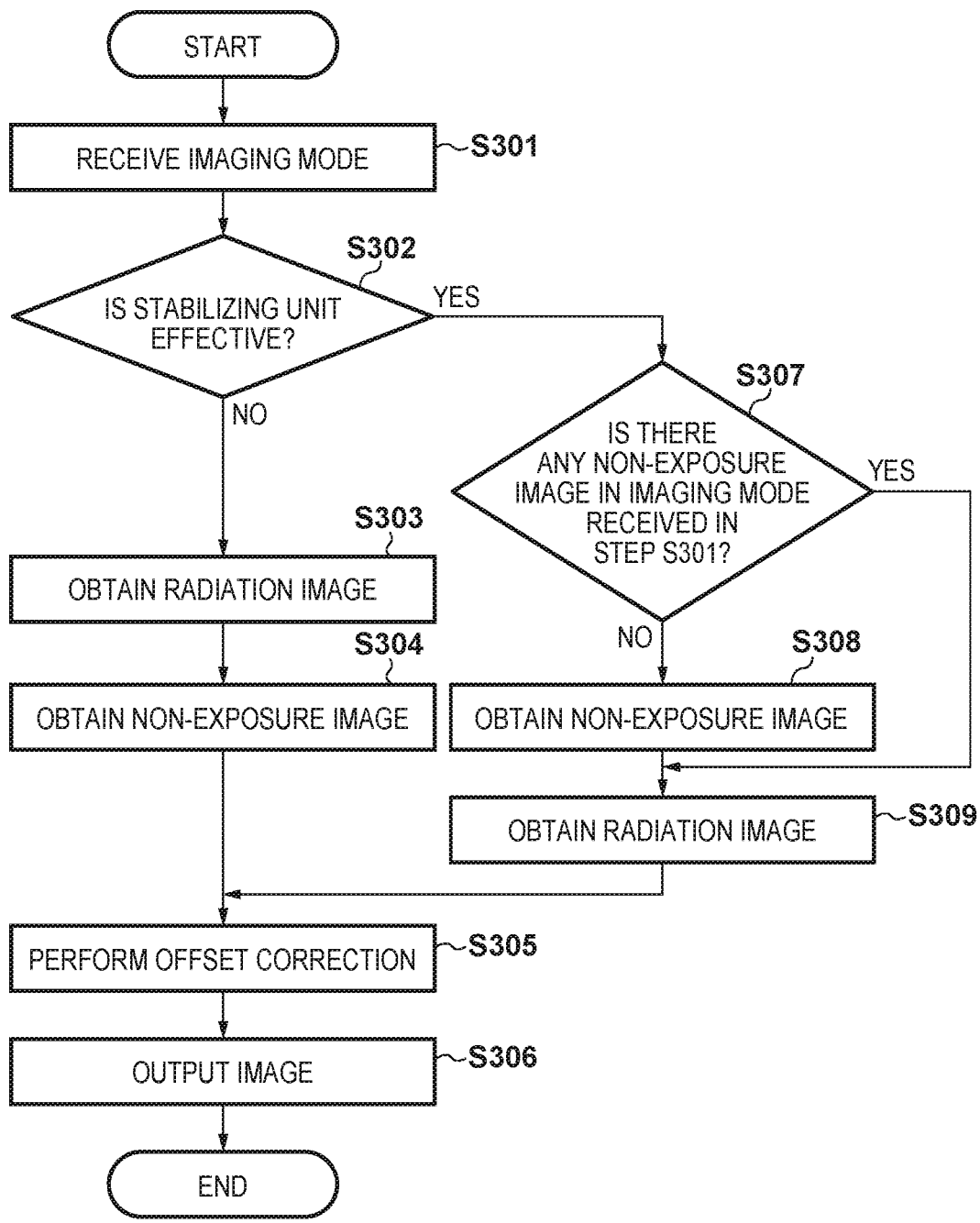
FIG. 3 is a flowchart showing the operation of the radiation imaging apparatus according to the first embodiment.

A procedure for image processing including offset correction processing according to this embodiment will be described next with reference to FIG. 3. FIG. 3 is a flowchart showing an example of the operation of the radiation imaging apparatus 1 according to the embodiment.

In step S301, the user inputs an imaging mode for obtaining a radiation image of an object via the input device 4. In according to this operation, the radiation imaging apparatus 1 receives the imaging mode via the controller 2, the switching HUB 7, and the AP 8. In this case, the display device 3 may display one or more imaging modes that can be selected to allow the user to select an imaging mode.

In step S302, the temperature stabilizing unit monitoring unit 153 determines whether the temperature stabilizing unit 201 effectively functions for the radiation imaging apparatus 1. For example, the temperature stabilizing unit monitoring unit 153 determines whether the temperature stabilizing unit 201 is connected to the radiation imaging apparatus 1. For example, the temperature stabilizing unit monitoring unit 153 switches, based on the termination performed by the temperature stabilizing unit monitoring unit 153, between the first mode (steps S307 to S309) of obtaining correction images before imaging for a plurality of radiation images and the second mode (steps S303 and S304) of obtaining a correction image for each radiation-image imaging operation.

If the temperature stabilizing unit 201 is not connected to the radiation imaging apparatus 1 (the temperature stabilizing unit 201 is not effectively functioning) (NO in step S302), the process advances to step S303.

In step S303, the imaging apparatus control unit 151 outputs an instruction to generate radiation to the radiation source controller 5 via the wireless communication unit 131, the antenna 132, and the like. In accordance with this operation, the radiation source 9 irradiates the radiation imaging apparatus 1 with the radiation 10 through the object 11. The detection module 110 then obtains a radiation image of an object in the imaging mode received in step S301. In other word, in this case, the imaging apparatus control unit 151 and the detection module 110 function as the imaging unit and start driving operations (obtaining a radiation image).

In step S304, the imaging apparatus control unit 151 instructs the driving circuit 112 and the reading circuit 113 to obtain non-exposure image data as a correction image by performing imaging without irradiation with radiation in the imaging mode received in step S301. In accordance with this operation, the reading circuit 113 obtains non-exposure image data and stores the data as offset correction data in the storage unit 122.

In step S305, the image processing unit 121 performs offset correction processing by subtracting the offset correction data obtained in step S304 from the radiation image obtained in step S303. In step S306, the image processing unit 121 outputs the correction image having undergone offset correction processing in step S305.

As described above, if the temperature stabilizing unit 201 is not connected to the radiation imaging apparatus 1 (NO in step S302), the radiation imaging apparatus 1 obtains non-exposure image data (step S304) after imaging of an object so as to obtain non-exposure image data as a correction image for each radiation image (step S303).

If the imaging apparatus control unit 151 determines in step S302 that the temperature stabilizing unit 201 is connected to the radiation imaging apparatus 1 (the temperature stabilizing unit 201 is effectively functioning) (YES in step S302), the process advances to step S307.

In step S307, the imaging apparatus control unit 151 determines whether there has already been non-exposure image data obtained by performing imaging without irradiation with radiation in the imaging mode received in step S301. For example, the imaging apparatus control unit 151 determines whether non-exposure image data is stored in the storage unit 122. If no non-exposure image data is stored (NO in step S307), the process advances to step S308. If non-exposure image data is stored (YES in step S307), the process advances to step S309.

In step S308, the imaging apparatus control unit 151 instructs the driving circuit 112 and the reading circuit 113 to obtain non-exposure image data by performing imaging without irradiation with radiation in the imaging mode received in step S301. In accordance with this operation, the reading circuit 113 obtains non-exposure image data and stores the data as offset correction data in the storage unit 122. In other words, in this case, the imaging apparatus control unit 151 and the detection module 110 function as the obtaining unit to obtain image data (correction image) without irradiation with the radiation 10.

Note that the image processing unit 121 may generate offset correction data from a plurality of non-exposure image data stored in the storage unit 122. For example, the image processing unit 121 may obtain a plurality of non-exposure image data and generate the average of the data as offset correction data.

In step S309, the imaging apparatus control unit 151 outputs an instruction to start the generation of radiation to the radiation source controller 5 via the wireless communication unit 131, the antenna 132, and the like. In accordance with this operation, the radiation source 9 irradiates the radiation imaging apparatus 1 with the radiation 10 through the object 11. The detection module 110 then obtains a radiation image of an object in the imaging mode received in step S301. The process then advances to steps S305 and S306.

If the temperature stabilizing unit 201 is connected to the radiation imaging apparatus 1 (YES in step S302), non-exposure image data are obtained as correction images before a plurality of radiation images are obtained.

As described above, in this embodiment, the radiation imaging apparatus 1 switches between the offset correction methods (that is, the modes of obtaining correction images (offset correction data)) in accordance with whether the radiation imaging apparatus 1 is connected to the temperature stabilizing unit 201. This makes it possible to select a proper offset correction method in accordance with the state of the temperature stabilizing unit 201 and satisfy both the requirements for the image quality of obtained images and the possible imaging time and possible number of frames that can be obtained. This can improve convenience for the user.

Second Embodiment

The second embodiment will exemplify a case in which offset correction methods are switched in accordance with the operation time during power supply from a battery 142 in addition to determination whether a radiation imaging apparatus 1 is connected to a temperature stabilizing unit 201.

Figure 4:
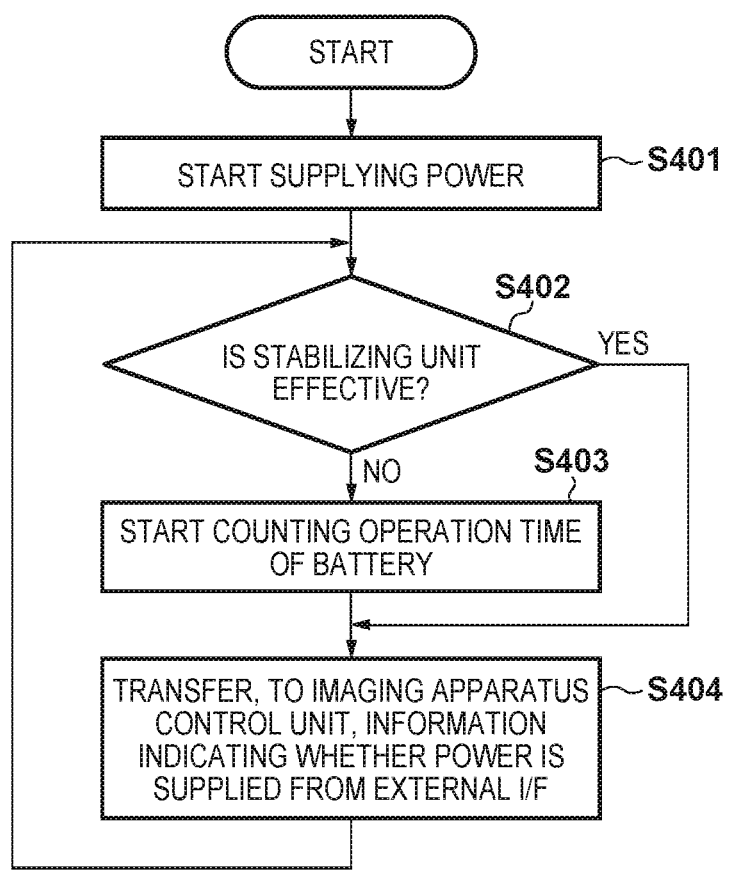
FIG. 4 is a flowchart showing the operation of a radiation imaging apparatus at the time of power-on according to the second embodiment.

The arrangement of the radiation imaging apparatus 1 is the same as that explained in FIGS. 1 and 2 in the first embodiment, and hence a description of the arrangement will be omitted. An operation at the time of power-on will be described next with reference to FIG. 4. FIG. 4 is a flowchart showing an example of the operation of the radiation imaging apparatus 1 at the time of power-on in this embodiment.

In step S401, an external I/F 141 or the battery 142 starts supplying power. In step S402, a temperature stabilizing unit monitoring unit 153 determines whether the temperature stabilizing unit 201 effectively functions for the radiation imaging apparatus 1. For example, the temperature stabilizing unit monitoring unit 153 determines whether the temperature stabilizing unit 201 is connected to the radiation imaging apparatus 1. If the temperature stabilizing unit 201 is not connected to the radiation imaging apparatus 1 (is not effectively functioning) (NO in step S402), the process advances to step S403. In step S403, a power control unit 152 starts counting the operation time during power supply from the battery 142. Note that when power is supplied from the external I/F 141, the count is set to 0 (zero).

In step S404, the power control unit 152 transfers, to the imaging apparatus control unit 151, information indicating whether power is supplied from the external I/F 141 (the external I/F 141 or the battery 142). The temperature stabilizing unit monitoring unit 153 transfers, to the imaging apparatus control unit 151, information indicating whether the temperature stabilizing unit 201 is connected to the radiation imaging apparatus 1 (the temperature stabilizing unit 201 is effectively functioning). Subsequently, the process returns to step S402 in which the imaging apparatus control unit 151 periodically checks during the operation of the radiation imaging apparatus 1 whether the imaging apparatus control unit 151 is connected to the temperature stabilizing unit 201.

Upon determining in step S402 that the temperature stabilizing unit 201 is connected to the radiation imaging apparatus 1 (is effectively functioning) (YES in step S402), the process advances to step S404. The processing in step S404 is the same as that described above.

Figure 5:
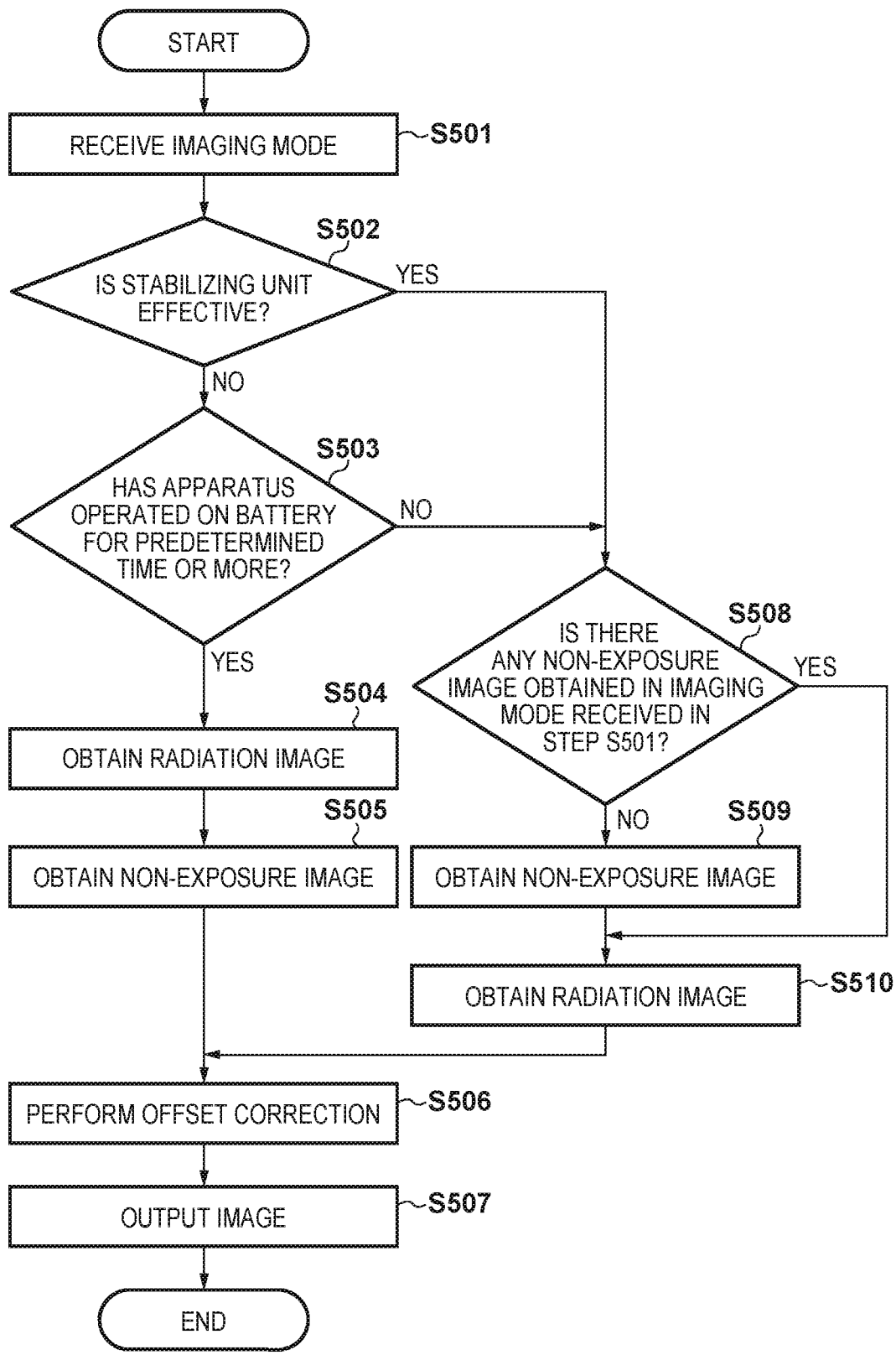
FIG. 5 is a flowchart showing the operation of the radiation imaging apparatus according to the second embodiment.

A procedure for image processing including offset correction processing will be described next with reference to FIG. 5. FIG. 5 is a flowchart showing an example of the operation of the radiation imaging apparatus 1 according to this embodiment.

In step S501, the user inputs an imaging mode of obtaining a radiation image of an object via an input device 4. In accordance with this operation, the radiation imaging apparatus 1 receives the imaging mode via a controller 2, a switching HUB 7, and an AP 8. In this case, a display device 3 may display one or more imaging modes that can be selected to allow the user to select an imaging mode.

In step S502, the temperature stabilizing unit monitoring unit 153 determines whether the temperature stabilizing unit 201 effectively functions for the radiation imaging apparatus 1. For example, the temperature stabilizing unit monitoring unit 153 determines whether the temperature stabilizing unit 201 is connected to the radiation imaging apparatus 1. If the temperature stabilizing unit 201 is not connected to the radiation imaging apparatus 1 (is not effectively functioning) (NO in step S502), the process advances to step S503.

In step S503, the imaging apparatus control unit 151 obtains, from the power control unit 152, the operation time during power supply from the battery 142. If the operation time is equal to or more than a predetermined time (YES in step S503), the process advances to step S504.

In steps S504 and S505, the radiation imaging apparatus 1 operates in the second mode of obtaining a correction image for each radiation-image imaging operation. In step S504, the imaging apparatus control unit 151 outputs an instruction to start the generation of radiation to a radiation source controller 5 via a wireless communication unit 131 and an antenna 132. In accordance with this operation, a radiation source 9 irradiates the radiation imaging apparatus 1 with radiation 10 through an object 11. The detection module 110 then obtains a radiation image of an object in the imaging mode received in step S501.

In step S505, the imaging apparatus control unit 151 instructs a driving circuit 112 and a reading circuit 113 to obtain non-exposure image data as a correction image by performing imaging without irradiation with radiation in the imaging mode received in step S501. In accordance with this operation, the reading circuit 113 obtains non-exposure image data and stores the data as offset correction data in a storage unit 122.

In step S506, an image processing unit 121 performs offset correction processing by subtracting the offset correction data obtained in step S505 from the radiation image obtained in step S504. In step S507, the image processing unit 121 outputs the correction image having undergone offset correction processing in step S506.

Upon determining in step S502 that the temperature stabilizing unit 201 is connected to the radiation imaging apparatus 1 (is effectively functioning) (YES in step S502), the process advances to step S508. In addition, upon determining in step S503 that the operation time during power supply from the battery 142 is less than the predetermined time (NO in step S503), the process advances to step S508 as in the above case.

In steps S508 to S510, the radiation imaging apparatus 1 operates in the first mode of obtaining correction images before imaging for a plurality of radiation images. In step S508, an imaging apparatus control unit 151 determines whether there has already been non-exposure image data obtained by performing imaging without irradiation with radiation in the imaging mode received in step S501. For example, an imaging apparatus control unit 151 determines whether non-exposure image data is stored in the storage unit 122. If no non-exposure image data is stored (NO in step S508), the process advances to step S509. If non-exposure image data is stored (YES in step S508), the process advances to step S510.

In step S509, the imaging apparatus control unit 151 instructs the driving circuit 112 and the reading circuit 113 to obtain non-exposure image data by performing imaging without irradiation with radiation in the imaging mode received in step S301. In accordance with this operation, the reading circuit 113 obtains non-exposure image data and stores the data as offset correction data in the storage unit 122.

Note that the image processing unit 121 may generate offset correction data from a plurality of non-exposure image data stored in the storage unit 122. For example, the image processing unit 121 may obtain a plurality of non-exposure image data and generates the average of the data as offset correction data.

In step S510, the imaging apparatus control unit 151 outputs an instruction to start the generation of radiation to the radiation source controller 5 via the wireless communication unit 131, the antenna 132, and the like. In accordance with this operation, the radiation source 9 irradiates the radiation imaging apparatus 1 with the radiation 10 through the object 11. A detection module 110 then obtains a radiation image of an object in the imaging mode received in step S501. The process then advances to steps S506 and S507.

In this manner, if NO in step S502 and YES in step S503, the radiation imaging apparatus 1 obtains non-exposure image data after imaging an object so as to obtain non-exposure image data as a correction image for each radiation-image imaging operation. In contrast to this, if YES in step S502 or if NO in step S502 and NO in step S503, the radiation imaging apparatus 1 obtains non-exposure image data as correction images before imaging for a plurality of radiation images.

As described above, in this manner, according to this embodiment, the offset correction methods (that is, the modes of obtaining correction images (offset correction data) are switched in accordance with the operation time during power supply from a battery in addition to determination whether the radiation imaging apparatus 1 is connected to the temperature stabilizing unit 201. This makes it possible to select offset correction processing suitable for high frame rate imaging under limited conditions even when the apparatus operates on a limited energy supply source such as a battery. As a result, this apparatus can satisfy both the requirements for the image quality of obtained images and the possible imaging time and possible number of frames that can be obtained, and improve convenience for the user.

Third Embodiment

The third embodiment will exemplify a case in which offset correction methods are switched in accordance with the remaining capacity of a battery 142 in addition to determination whether a radiation imaging apparatus 1 is connected to a temperature stabilizing unit 201.

Figure 6:
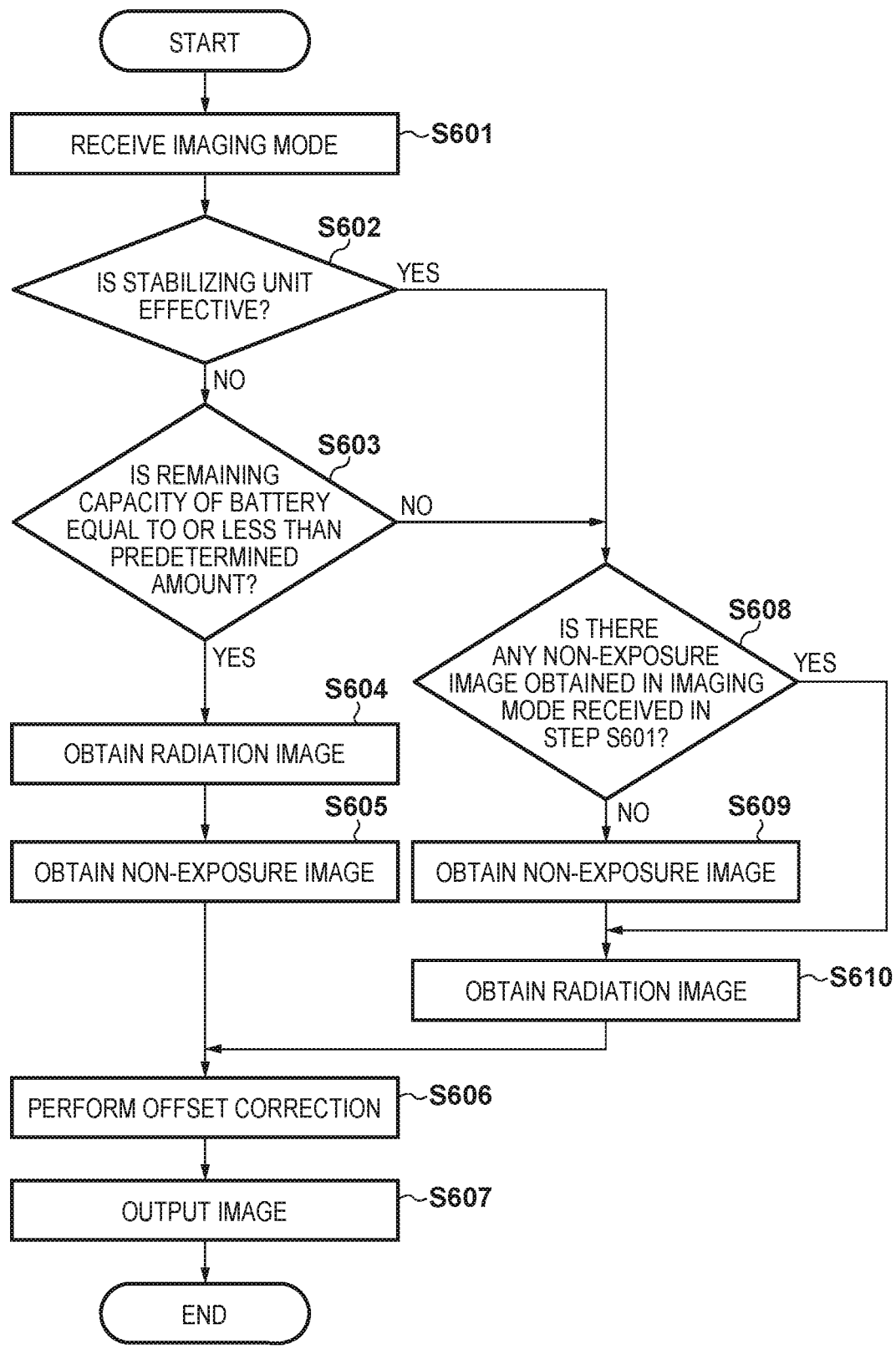
FIG. 6 is a flowchart showing the operation of a radiation imaging apparatus according to the third embodiment.

The arrangement of the radiation imaging apparatus 1 is the same as that shown in FIGS. 1 and 2 described in the first embodiment, and hence a description of the arrangement will be omitted. A procedure for image processing including offset correction processing will be described next with reference to FIG. 6. FIG. 6 is a flowchart showing an example of the operation of the radiation imaging apparatus 1 according to this embodiment.

In step S601, the user inputs an imaging mode of obtaining a radiation image of an object via the input device 4. In according to this operation, the radiation imaging apparatus 1 receives the imaging mode via a controller 2, a switching HUB 7, and an AP 8. In this case, a display device 3 may display one or more imaging modes that can be selected to allow the user to select an imaging mode.

In step S602, a temperature stabilizing unit monitoring unit 153 determines whether the temperature stabilizing unit 201 effectively functions for the radiation imaging apparatus 1. For example, the temperature stabilizing unit monitoring unit 153 determines whether the temperature stabilizing unit 201 is connected to the radiation imaging apparatus 1. If the temperature stabilizing unit 201 is not connected to the radiation imaging apparatus 1 (is not effectively functioning) (NO in step S602), the process advances to step S603.

In step S603, an imaging apparatus control unit 151 obtains information about the remaining capacity of the battery from a power control unit 152. If the remaining capacity is equal to or less than a predetermined amount (YES in step S603), the process advances to step S604.

In steps S604 and S605, the radiation imaging apparatus 1 operates in the second mode of obtaining a correction image for each radiation-image imaging operation. In step S604, the imaging apparatus control unit 151 outputs an instruction to start the generation of radiation to the radiation source controller 5 via a wireless communication unit 131, an antenna 132, and the like. In accordance with this operation, a radiation source 9 irradiates the radiation imaging apparatus 1 with radiation 10 through an object 11. The detection module 110 then obtains a radiation image of an object in the imaging mode received in step S601.

In step S605, the imaging apparatus control unit 151 instructs a driving circuit 112 and a reading circuit 113 to obtain image data (non-exposure image data) by performing imaging without irradiation with radiation in the imaging mode received in step S601. In accordance with this operation, the reading circuit 113 obtains non-exposure image data and stores the data as offset correction data in the storage unit 122.

In step S606, an image processing unit 121 performs offset correction processing by subtracting the offset correction data from the radiation image. In step S607, the image processing unit 121 outputs the correction image having undergone the offset correction processing in step S606.

Upon determining in step S602 that the temperature stabilizing unit 201 is connected to the radiation imaging apparatus 1 (is effectively functioning) (YES in step S602), the process advances to step S608. In addition, upon determining in step S603 that the remaining capacity of the battery is larger than a predetermined amount (NO in step S603), the process advances to step S608 as in the above processing.

In steps S608 to S610, the radiation imaging apparatus 1 operates in the first mode of obtaining correction images before imaging for a plurality of radiation images. In step S608, the imaging apparatus control unit 151 determines whether there has already been non-exposure image data obtained by performing imaging without irradiation with radiation in the imaging mode received in step S601. For example, the imaging apparatus control unit 151 determines whether non-exposure image data is stored in a storage unit

122. If no non-exposure image data is stored (NO in step S608), the process advances to step S609. If non-exposure image data is stored (YES in step S608), the process advances to step S610.

In step S609, the imaging apparatus control unit 151 instructs the driving circuit 112 and the reading circuit 113 to obtain non-exposure image data by performing imaging without irradiation with radiation in the imaging mode received in step S601. In accordance with this operation, the reading circuit 113 obtains non-exposure image data and stores the data as offset correction data in the storage unit 122.

Note that the image processing unit 121 may generate offset correction data from a plurality of non-exposure image data stored in the storage unit 122. For example, the image processing unit 121 may obtain a plurality of non-exposure image data and generates the average of the data as offset correction data.

In step S610, the imaging apparatus control unit 151 outputs an instruction to start the generation of radiation to the radiation source controller 5 via the wireless communication unit 131, the antenna 132, and the like. In accordance with this operation, the radiation source 9 irradiates the radiation imaging apparatus 1 with the radiation 10 through the object 11. The detection module 110 then obtains a radiation image of an object in the imaging mode received in step S601. The process then advances to steps S606 and S607.

In this manner, if NO in step S602 and YES in step S603, the radiation imaging apparatus 1 obtains non-exposure image data after imaging an object so as to obtain non-exposure image data as a correction image for each radiation-image imaging operation. In contrast to this, if YES in step S602 or if NO in step S602 and NO in step S603, the radiation imaging apparatus 1 obtains non-exposure image data as correction images before imaging for a plurality of radiation images.

As described above, according to this embodiment, the offset correction methods (that is, the modes of obtaining correction images (offset correction data)) are switched in accordance with the remaining capacity of the battery in addition to determining whether the radiation imaging apparatus 1 is connected to the temperature stabilizing unit 201. This makes it possible to select offset correction processing suitable for high frame rate imaging under limited conditions even when the apparatus operates on a limited energy supply source such as a battery. As a result, this apparatus can satisfy both the requirements for the image quality of obtained images and the possible imaging time and possible number of frames that can be obtained, and improve convenience for the user.

Fourth Embodiment

The fourth embodiment will exemplify a case in which offset correction methods are switched in accordance with the required number of frames in addition to determining whether a radiation imaging apparatus 1 is connected to a temperature stabilizing unit 201. In this case, the required number of frames means the number of frames determined before imaging. Imaging with the number of frames determined in advance includes, for example, angiography in tomosynthesis and imaging in DSA (Digital Subtraction Angiography).

Figure 7:
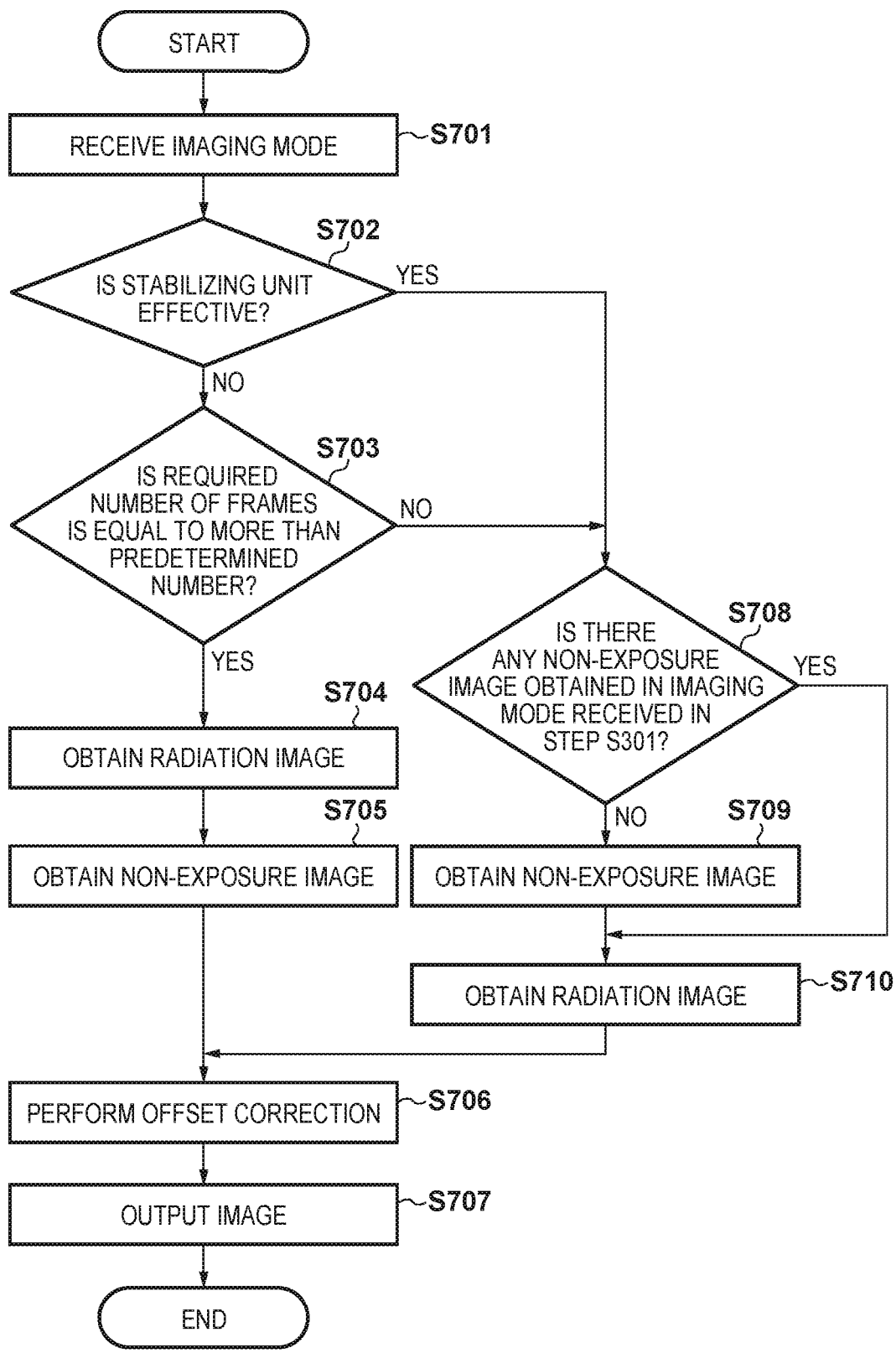
FIG. 7 is a flowchart showing the operation of a radiation imaging apparatus according to the fourth embodiment.

The arrangement of the radiation imaging apparatus 1 is the same as that shown in FIGS. 1 and 2 described in the first embodiment, and hence a description of the arrangement will be omitted. A procedure for image processing including offset correction processing will be described next with reference to FIG. 7. FIG. 7 is a flowchart showing an example of the operation of the radiation imaging apparatus 1 according to this embodiment.

In step S701, the user inputs an imaging mode of obtaining a radiation image of an object via an input device 4. In accordance with this operation, the radiation imaging apparatus 1 receives an imaging mode via a controller 2, a switching HUB 7, and an AP 8. In this case, a display device 3 may display one or more imaging modes that can be selected to allow the user to select an imaging mode.

In step S702, a temperature stabilizing unit monitoring unit 153 determines whether the temperature stabilizing unit 201 effectively functions for the radiation imaging apparatus 1. For example, the temperature stabilizing unit monitoring unit 153 determines whether the temperature stabilizing unit 201 is connected to the radiation imaging apparatus 1. If the temperature stabilizing unit 201 is not connected to the radiation imaging apparatus 1 (is not effectively functioning) (NO in step S702), the process advances to step S703.

In step S703, an imaging apparatus control unit 151 determines whether the required number of frames included in the imaging mode received in step S701 is equal to or more than a predetermined number. If the required number of frames is equal to or more than the predetermined number (YES in step S703), the process advances to step S704.

In steps S704 and S705, the radiation imaging apparatus 1 operates in the second mode of obtaining a correction image for each radiation-image imaging operation. In step S704, the imaging apparatus control unit 151 outputs an instruction to start the generation of radiation to the radiation source controller 5 via a wireless communication unit 131, an antenna 132, and the like. In accordance with this operation, a radiation source 9 irradiates the radiation imaging apparatus 1 with radiation 10 through an object 11. The detection module 110 then obtains a radiation image of an object in the imaging mode received in step S701.

In step S705, the imaging apparatus control unit 151 instructs a driving circuit 112 and a reading circuit 113 to obtain non-exposure image data as a correction image by performing imaging without irradiation with radiation in the imaging mode received in step S701. In accordance with this operation, the reading circuit 113 obtains non-exposure image data and stores the data as offset correction data in a storage unit 122.

In step S706, an image processing unit 121 performs offset correction processing by subtracting the offset correction data from the radiation image. In step S707, the image processing unit 121 outputs the correction image having undergone the offset correction processing in step S706.

Upon determining in step S702 that the temperature stabilizing unit 201 is connected to the radiation imaging apparatus 1 (is effectively functioning) (YES in step S702), the process advances to step S708. In addition, upon determining in step S703 that the required number of frames included in the imaging mode received in step S701 is less than the predetermined number (NO in step S703), the process advances to step S708 as in the above processing.

In steps S708 to S710, the radiation imaging apparatus 1 operates in the first mode of obtaining correction images before imaging for a plurality of radiation images. In step S708, the imaging apparatus control unit 151 determines whether there has already been non-exposure image data obtained by performing imaging without irradiation with radiation in the imaging mode received in step S501. If no non-exposure image data is stored (NO in step S708), the process advances to step S709. If non-exposure image is stored (YES in step S708), the process advances to step S710.

In step S709, the imaging apparatus control unit 151 instructs the driving circuit 112 and the reading circuit 113 to obtain non-exposure image data by performing imaging without irradiation with radiation in the imaging mode received in step S701. In accordance with this operation, the reading circuit 113 obtains non-exposure image data and stores the data as offset correction data in the storage unit 122.

Note that the image processing unit 121 may generate offset correction data from a plurality of non-exposure image data stored in the storage unit 122. For example, the image processing unit 121 may obtain a plurality of non-exposure image data and generates the average of the data as offset correction data.

In step S710, the imaging apparatus control unit 151 outputs an instruction to start the generation of radiation to the radiation source controller 5 via the wireless communication unit 131, the antenna 132, and the like. In accordance with this operation, the radiation source 9 irradiates the radiation imaging apparatus 1 with the radiation 10 through the object 11. The detection module 110 then obtains a radiation image of an object in the imaging mode received in step S701. The process then advances to steps S706 and S707.

In this manner, if NO in step S702 and YES in step S703, the radiation imaging apparatus 1 obtains non-exposure image data after imaging an object so as to obtain non-exposure image data as a correction image for each radiation-image imaging operation. In contrast to this, if YES in step S702 or if NO in step S702 and NO in step S703, the radiation imaging apparatus 1 obtains non-exposure image data as correction images before obtaining a plurality of radiation images.

As described above, according to this embodiment, the offset correction methods (that is, the methods of obtaining offset correction data) are switched in accordance with the required number of frames in addition to determining whether the radiation imaging apparatus 1 is connected to the temperature stabilizing unit 201. This makes it possible to select offset correction processing suitable for high frame rate imaging under limited conditions even when the apparatus operates on a limited energy supply source such as a battery. As a result, this apparatus can satisfy both the requirements for the image quality of obtained images and the possible imaging time and possible number of frames that can be obtained, and improve convenience for the user.

MODIFICATION

The second to fourth embodiments each include a determination step in addition to the step of determining whether the apparatus is connected to the temperature stabilizing unit 201. A modification may be provided with a determination step as a combination of two or more other determination steps in the respective embodiments and configured to switch between the offset correction methods (that is, the methods of obtaining offset correction data).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-056461, filed Mar. 22, 2017 which is hereby incorporated by reference herein in its entirety.

What is claimed is:

1. A radiation imaging system comprising:
   a radiation imaging apparatus configured to obtain a radiation image of an object based on radiation applied from a radiation source and reaching through the object, wherein the radiation imaging apparatus may obtain a correction image by performing imaging without irradiation with the radiation from the radiation source;
   a temperature stabilizing unit configured to stabilize a change in temperature of a radiation imaging apparatus;
   one or more processors; and
   a memory including instructions stored thereon which, when executed by the one or more processors, cause the radiation imaging system to function as:
   an image processing unit configured to perform, using the correction image, image processing for correcting an offset component appearing in the radiation image on the radiation image;
   a determination unit configured to determine whether stabilization of a change in temperature of the radiation imaging apparatus by the temperature stabilizing unit is effectively functioning; and
   a control unit configured to control the radiation imaging apparatus so that the radiation imaging apparatus obtains the radiation image and obtains the correction image, wherein
   the control unit controls the radiation imaging apparatus in a first mode of obtaining the correction image before a plurality of the radiation images are obtained by the radiation imaging apparatus in a case where it is determined by the determination unit that stabilization of a change in temperature of the radiation imaging apparatus is effectively functioning, and the control unit controls the radiation imaging apparatus in a second mode of obtaining the correction image for each obtaining operation for the radiation image by the radiation imaging apparatus in a case where it is determined by the determination unit that stabilization of a change in temperature of the radiation imaging apparatus is not effectively functioning.

2. The system according to claim 1, wherein the radiation imaging apparatus includes the control unit, the obtaining unit, the image processing unit, the determination unit and the temperature stabilizing unit.

3. The system according to claim 1, wherein the radiation imaging apparatus operates on power supplied from a battery or supplied externally, and the control unit controls the radiation imaging apparatus in the second mode, when the determination unit determines that stabilization of a change in temperature of the radiation imaging apparatus is not effectively functioning and an operation time of the radiation imaging apparatus on the battery is not less than a predetermined time.

4. The system according to claim 3, wherein the control unit controls the radiation imaging apparatus in the first mode, when the determination unit determines that stabilization of a change in temperature of the radiation imaging apparatus is effectively functioning or when the determination unit determines that stabilization of a change in temperature of the radiation imaging apparatus is not effectively functioning and an operation time of the radiation imaging apparatus on the battery is less than the predetermined time.

5. The system according to claim 1, wherein the radiation imaging apparatus operates on power supplied from a battery or supplied externally, and the control unit controls the radiation imaging apparatus in the second mode, when the determination unit determines that stabilization of a change in temperature of the radiation imaging apparatus is not effectively functioning and the radiation imaging apparatus operates on the battery whose remaining capacity is not more than a predetermined amount.

6. The system according to claim 5, wherein the control unit controls the radiation imaging apparatus in the first mode when the determination unit determines that stabilization of a change in temperature of the radiation imaging apparatus is effectively functioning or when the determination unit determines that stabilization of a change in temperature of the radiation imaging apparatus is not effectively functioning and when the radiation imaging apparatus is not operating on the battery whose remaining capacity is not more than the predetermined amount.

7. The system according to claim 1, wherein the control unit controls the radiation imaging apparatus in the second mode when the determination unit determines that stabilization of a change in temperature of the radiation imaging apparatus is not effectively functioning and when the number of the radiation images to be obtained by the imaging unit is determined to be not less than a predetermined number.

8. The system according to claim 7, wherein the control unit controls the radiation imaging apparatus in the first mode when the determination unit determines that stabilization of a change in temperature of the radiation imaging apparatus is effectively functioning or when the determination unit determines that stabilization of a change in temperature of the radiation imaging apparatus is not effectively functioning and when the number of the radiation images to be obtained by the imaging unit is determined to be not less than the predetermined number.

9. The system according to claim 1, wherein the radiation imaging apparatus may obtain the correction image from a plurality of images obtained by performing imaging without irradiation with the radiation from the radiation source.

10. A radiation imaging method using a radiation imaging apparatus configured to obtain a radiation image of an object based on radiation applied from a radiation source and reaching though the object, wherein the radiation imaging apparatus may obtain a correction image by performing imaging without irradiation with the radiation from the radiation source, the method comprising:

performing, using the correction image, image processing for correcting an offset component appearing in the radiation image on the radiation image;

controlling the radiation imaging apparatus so that the radiation imaging apparatus obtains the radiation image in a first mode of obtaining the correction image before a plurality of the radiation images are obtained in a case where it is determined that stabilization of a change in temperature of the radiation imaging apparatus is effectively functioning; and controlling the radiation imaging apparatus so that the radiation imaging apparatus obtains the radiation image in a second mode of obtaining the correction image for each obtaining operation for the radiation image by the radiation imaging apparatus in a case where it is determined that stabilization of a change in temperature of the radiation imaging apparatus is not effectively functioning.

11. A non-transitory computer-readable storage medium storing a computer program for causing a computer to execute a radiation imaging method, the method comprising:

performing, using the correction image, image processing for correcting an offset component appearing in the radiation image on the radiation image;

controlling the radiation imaging apparatus so that the radiation imaging apparatus obtains the radiation image in a first mode of obtaining the correction image before a plurality of the radiation images are obtained in a case where it is determined that stabilization of a change in temperature of the radiation imaging apparatus is effectively functioning; and controlling the radiation imaging apparatus so that the radiation imaging apparatus obtains the radiation image in a second mode of obtaining the correction image for each obtaining operation for the radiation image by the radiation imaging apparatus in a case where it is determined that stabilization of a change in temperature of the radiation imaging apparatus is not effectively functioning.

* * * * *